United States Patent [19]

Hiroi

[11] Patent Number: 5,119,288
[45] Date of Patent: Jun. 2, 1992

[54] CONTROLLING APPARATUS UTILIZED IN PROCESS INSTRUMENTATION SYSTEM

[75] Inventor: Kazuo Hiroi, Hachioji, Japan

[73] Assignee: Kabushiki Kaisha Toshiba, Kawasaki, Japan

[21] Appl. No.: 546,741

[22] Filed: Jul. 2, 1990

[30] Foreign Application Priority Data

Jul. 7, 1989 [JP] Japan .................. 1-176088

[51] Int. Cl.$^5$ ............................................. G05B 13/02
[52] U.S. Cl. .................................. 364/163; 364/153; 364/174; 364/176
[58] Field of Search ................. 364/160–163, 364/157, 158, 176, 177, 153, 154, 174, 183; 318/609, 610, 632, 561

[56] References Cited

U.S. PATENT DOCUMENTS

| | | | |
|---|---|---|---|
| 4,698,745 | 10/1987 | Hiroi et al. | 364/157 X |
| 4,714,988 | 12/1987 | Hiroi et al. | 364/176 X |
| 4,755,924 | 7/1988 | Hiroi et al. | 364/160 X |

FOREIGN PATENT DOCUMENTS

| | | |
|---|---|---|
| 0036437 | 9/1981 | European Pat. Off. |
| 0362801 | 4/1990 | European Pat. Off. |
| 2384292 | 3/1977 | France |
| 2524169 | 3/1983 | France |

OTHER PUBLICATIONS

Automatisierungstechnik-At., vol. 35, No. 11, 1987, Munchen De, pp. 464–465; A. H. Glattfelder: "Zum Fuhrungsverhalten von Pid-Arw-Eingrossenkreisen".

Primary Examiner—Joseph Ruggiero
Attorney, Agent, or Firm—Oblon, Spivak, McClelland, Maier & Neustadt

[57] ABSTRACT

A controlling apparatus comprises a portion for calculating a deviation between a process variable from a controlled system and a target value, a first portion for receiving the deviation and executing a velocity-type I controlling calculation to obtain a first calculation output, a second portion for receiving the deviation and executing a velocity-type P or PD controlling calculation to obtain a second calculation output, a summing portion for summing the first and second calculation outputs to obtain a velocity-type manipulative variable, a conversion portion for converting the velocity-type manipulative variable into a positional manipulative variable, a portion for limiting a magnitude of the positional manipulative variable between upper and lower limits, and limiting a change rate of the positional manipulative variable within a predetermined change rate, and a judgment portion for judging whether or not the positional manipulative variable is deviated from at least one of upper and lower limits and the change rate. The first portion includes an output unit for the first calculation output, and a stopping unit for selectively stopping the output of the first calculation output. When the judgment portion determines that the manipulative variable is deviated, it supplies a signal to the stopping unit, and stops the summing operation by the summing portion.

7 Claims, 7 Drawing Sheets

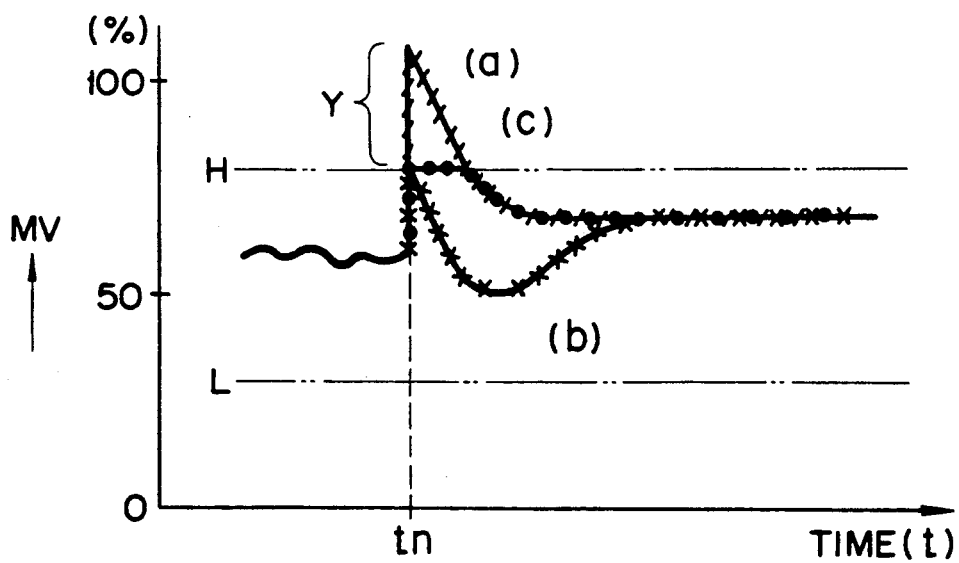
F I G. 2

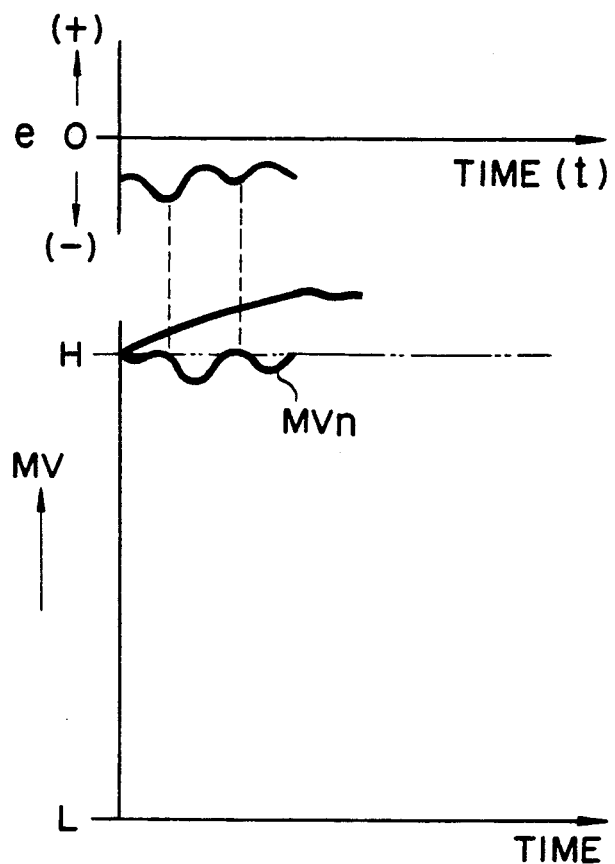
F I G. 3
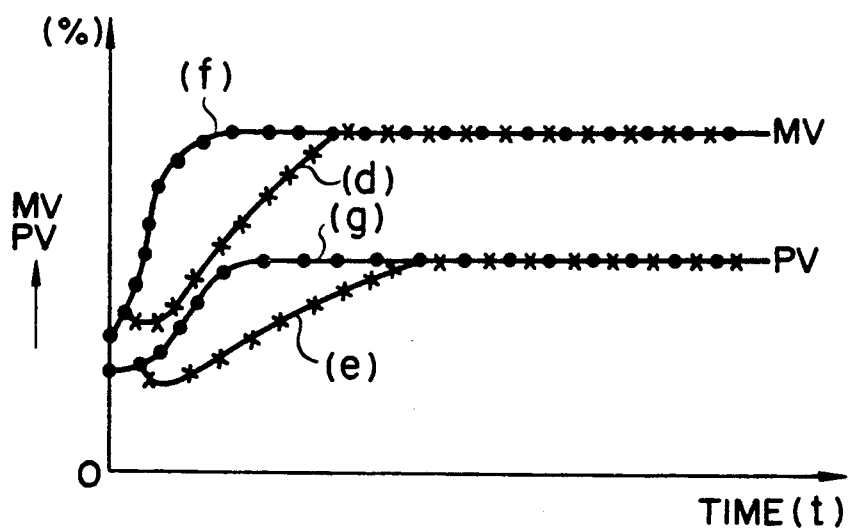
F I G. 4

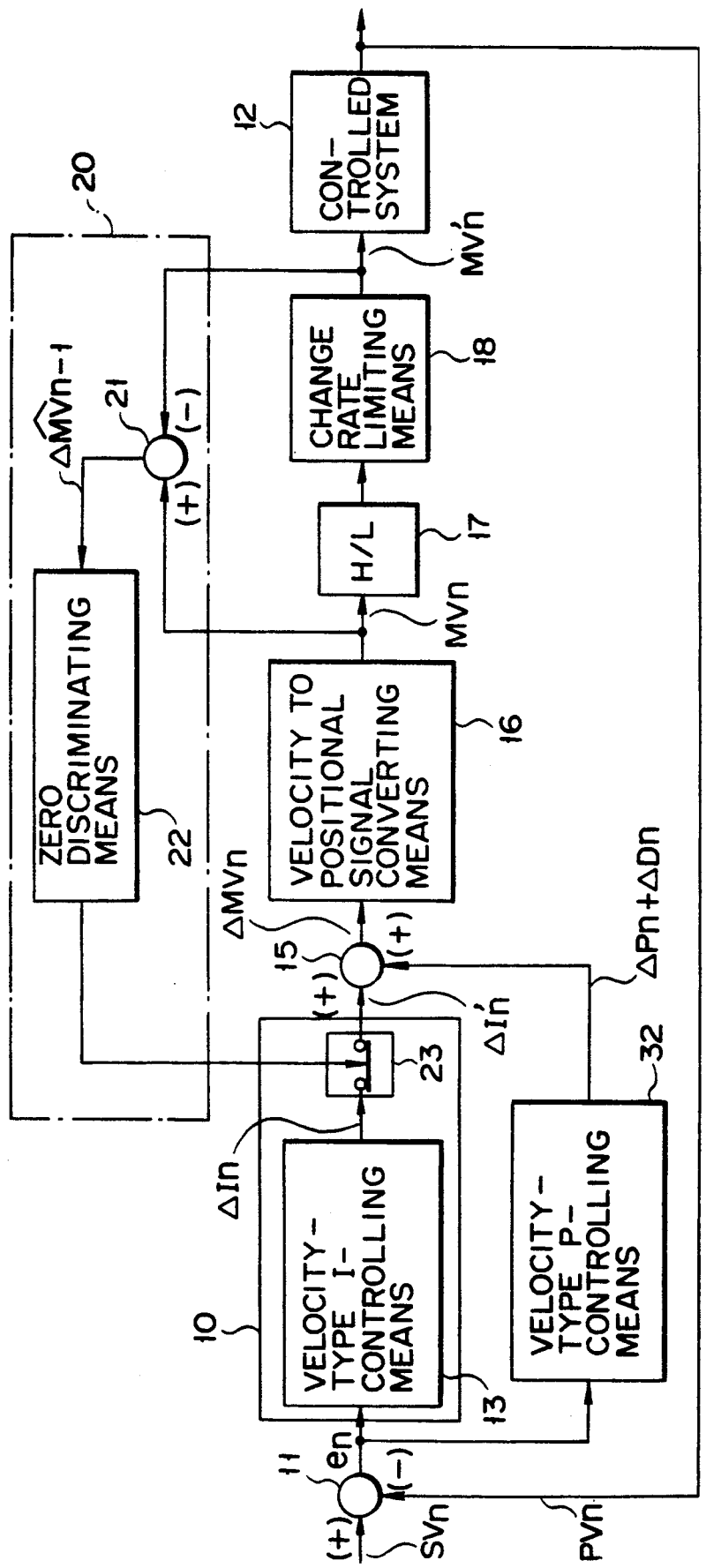
F I G. 7

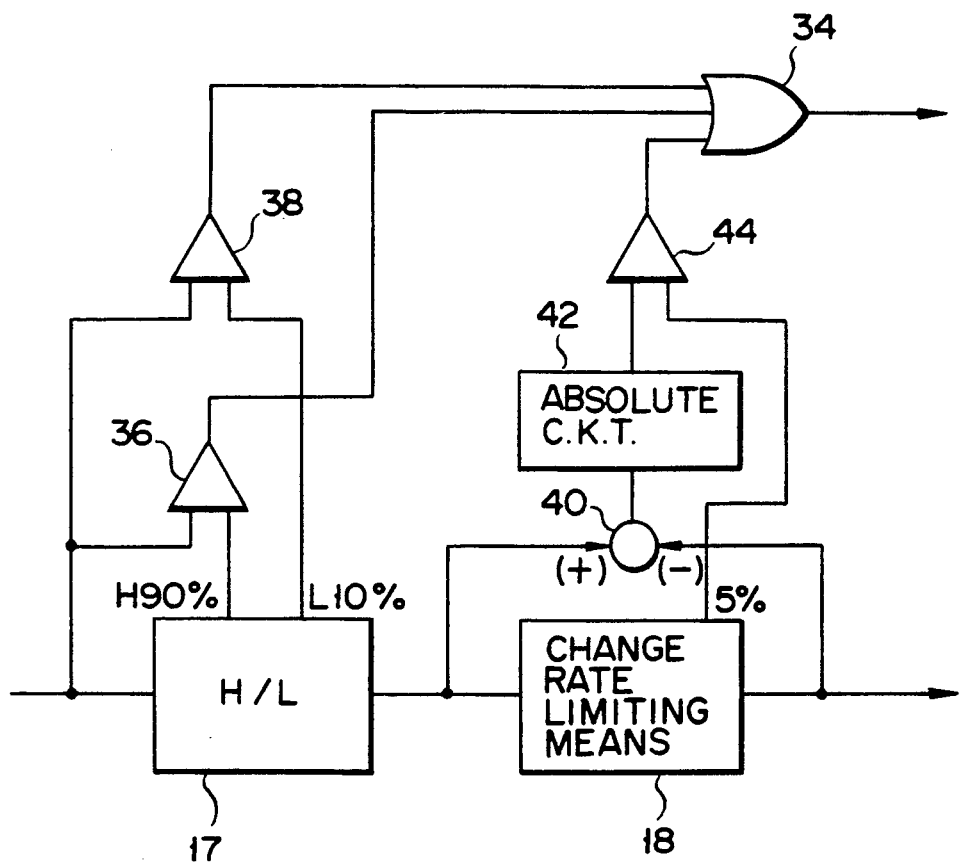
F I G. 9

CONTROLLING APPARATUS UTILIZED IN PROCESS INSTRUMENTATION SYSTEM

BACKGROUND OF THE INVENTION

1. Field of the Invention

The present invention relates to a controlling apparatus utilized in various process instrumentation systems and, more particularly, to a controlling apparatus for, when a manipulative variable is deviated from one of upper and lower limit values and a change rate limit value, controlling a velocity-type I controlling output without omitting a velocity-type PD controlling output or a velocity-type P controlling output, so that the manipulative variable can be matched with various limitation conditions of a real process.

2. Description of the Related Art

PID (P: Proportional, I: Integral, D: Derivative) controlling apparatuses are widely utilized in instrumentation systems of various industrial fields, and are indispensable for plant operation control among these systems. A PID calculation method applied to the PID controlling apparatus is classified into analog and digital calculation methods. The digital calculation method is popular in the current PID controlling apparatuses.

A fundamental formula of a PID algorithm in the PID calculation method is expressed by:

$$MV = K_p \{e + (1/T_I)\int e \, dt + T_D(de/dt) + MV_0\} \quad (1)$$

where MV is the manipulative variable, e is the deviation, Kp is the proportional gain, $T_I$ is the integral time, $T_D$ is the derivative time, and $MV_0$ is the initial value of the manipulative variable.

The digital calculation method using fundamental formula (1) has a predetermined sampling period $\tau$. Necessary data is sampled for every sampling periods $\tau$ to execute calculations. Therefore, if the present sampling time is represented by $n\tau$ (n is an integer), and an immediately preceding sampling time is represented by $(n-1)\tau$, a deviation at the present sampling time obtained from a control system can be expressed by $e_n$, and a deviation at the immediately preceding sampling time can be expressed by $e_{n-1}$.

The digital calculation method is classified into two ways of calculation methods. One method is a positional calculation method, and the other method is a velocity-type calculation method. In the positional calculation method, an overall manipulative variable $MV_n$ is directly calculated for each sampling period. In the velocity-type calculation method, in each sampling period, after a change $\Delta MV_n$ is calculated from an immediately manipulative variable, the change $\Delta MV_n$ is added to the immediately preceding manipulative variable $MV_{n-1}$, thereby obtaining the present manipulative variable.

Therefore, when the positional calculation method is executed using fundamental formula (1) of the PID algorithm, the manipulative variable $MV_n$ is expressed by:

$$MV_n = K_p \left( e_n + (\tau/T_I) \sum_{i=1}^{n} e_i + (T_D/\tau)(e_n - e_{n-1}) \right) \quad (2)$$

In the velocity-type calculation method, the manipulative variable $MV_n$ is expressed by:

$$\Delta MV_n = K_p\{(e_n - e_{n-1}) + (\tau/T_I)e_n + (T_D/\tau)(e_n - 2e_{n-1} + e_{n-2})\} \quad (3a)$$

$$MV_n = MV_{n-1} + \Delta MV_n \quad (3b)$$

These two formulas, i.e., formula (2) and formula (3) including equations (3a) and (3b) will be compared.

The velocity-type PID algorithm given by formula (3) has the following features:

(a) Σ is eliminated from an integral term, and a calculation can be simplified, (b) upon switching between manual and automatic modes, after a manipulative variable obtained in the present manual operation is substituted in $MV_{n-1}$ in equation (3b), automatic control is selected, and the change $\Delta MV_n$ is added to the variable $MV_{n-1}$ from the next sampling time, so that control can be continued, and hence, balanceless-bumpless switching of manual-automatic switching can be easily attained, (c) reset windup by an integral term can be easily performed, and (d) since a change in manipulative variable need only be obtained, a gain can be easily corrected, and complex calculation processing with other variables can be easily performed.

Therefore, the velocity-type PID calculation method is frequently used in DDC (Direct Digital Control) using a computer.

In a controlling apparatus of this type, even if any of the analog calculation method, the positional digital calculation method, and the velocity-type digital calculation method is employed, when a manipulative variable becomes too large or too small, a plant is placed in a dangerous state. Thus, the manipulative variable has upper and lower limit values. Since it is not preferable to give an abrupt change to a downstream process, an operation terminal of a controlled system, or an amount of control of, e.g., steam, fuel, water, air, or the like, a manipulative variable is applied to the control signal while giving a certain limitation to a change rate of the manipulative variable. It is indispensable for the safety of a control system to limit a manipulative variable by giving an appropriate magnitude and change rate to it by the upper/lower limiting means and the change rate limiting means according to various limitation conditions and characteristics of a controlled system, and user's demands in control.

FIG. 1 is a block diagram of a conventional velocity-type PID controlling apparatus. In this apparatus, a deviation calculating means 1 subtracts a present process variable $PV_n$ of a controlled system 2 from a present target value $SV_n$. The obtained deviation $e_n$ is supplied to a velocity-type PID controlling means 3. The velocity-type PID controlling means 3 performs a controlling calculation given by equation (3a), and outputs a velocity-type PID controlling output $\Delta MV_n$. The velocity-type PID controlling output $\Delta MV_n$ is supplied to a change rate limiting means 4, and is limited within a predetermined change rate range, thereby outputting an output $\Delta MV_n'$. The output $\Delta MV_n'$ is then supplied to a velocity-to-positional signal converting means 5 with upper and lower limits, and is limited within a range between predetermined upper and lower limit values. The velocity-to-positional signal converting means 5 executes a calculation according to equation (3b), i.e., $MV_n = MV_{n-1} + \Delta MV_n'$. The obtained manipulative variable $MV_n$ is applied to the controlled system 2. Thus, the controlled system 2 is controlled to have the deviation $e_n=0$, i.e., $SV_n=PV_n$.

As described above, when the PID controlling apparatus is applied to an actual process control system, a manipulative variable is largely changed by an abrupt change in target value $SV_n$ or an abrupt change in process variable $PV_n$ caused by a disturbance or the like. As a result, an abrupt change or an excessive manipulative amount is given to the controlled system 2, and this causes a damage and a decrease in service life of an operation terminal and piping system. Furthermore, upstream and downstream processes of the controlled system 2 are adversely influenced. In order to prevent this, the PID controlling apparatus comprises the change rate limiting means 4 and the velocity-to-positional signal converting means 5 to give a change rate limitation and upper and lower limitations to a manipulative variable. The PID controlling apparatus controls the manipulative variable using these means so that the controlled system 2 can be matched with various limitation conditions.

The controlling apparatus shown in FIG. 1 functionally gives a change rate limitation and upper and lower limitations to a manipulative variable. However, the method of limitation does not succeed "essence of PID control". As a result, the following industrially disadvantageous side effects occur when a manipulative variable is limited.

(1) When the deviation $e_n$ is changed stepwise or is pulsated and the PID controlling output $\Delta MV_n$ reaches a maximum point beyond an upper limit value, the manipulative variable is returned from its upper limit passing point by the P or D operation of the velocity-type PID controlling means 3. As a result, this leads to a control error or a decrease in safety. This is a serious industrial drawback.

A cause for this drawback will be explained in detail below. In FIG. 1, for example, when the deviation $e_n$ is changed stepwise, P+D operations mainly function at the beginning of the change. When there are no limitations at all in this case, the manipulative variable $MV_n$ behaves like a curve (a) in FIG. 2. However, in practice, the manipulative variable $MV_n$ is limited by an upper limit value H, and its Y portion is switched to a velocity-type signal. A decreased portion of the D operation is directly subtracted from the manipulative variable $MV_n$. As a result, the manipulative variable $MV_n$ behaves like a curve (b) in FIG. 2. Although a behavior like a curve (c) in FIG. 2 is preferable, the manipulative variable $MV_n$ is largely returned from the upper limit passing point in practice. That is, the PD control functions in a reverse direction, and as a result, a control error occurs. After the manipulative variable is decreased to a region posing a problem in terms of safety, the manipulative variable is slowly restored to a normal state by the I operation.

(2) Even if the manipulative variable exceeds the upper or lower limit value and the deviation $e_n$ is large, when the target value $SV_n$, the process variable $PV_n$, and the like slightly fluctuate, the manipulative variable varies near the limit value. A cause for this variation will be explained below. Assume that the manipulative variable $MV_n$ is limited by the velocity-to-positional signal converting means 5 but the deviation $e_n$ slightly fluctuates in, e.g., a negative region, as shown in FIG. 3. In this case, when the output $\Delta MV_n'$ of the change rate limiting means 4 changes to fall within the limitation range, the velocity-to-positional signal converting means 5 varies the output $MV_n$ to accept the output $\Delta MV_n'$.

(3) When the deviation $e_n$ is changed stepwise or is pulsated and the manipulative variable exceeds the change rate limit value, a velocity-type signal of the P and D operations is omitted. As described above, the manipulative variable is returned by the D operation, and then comes closer to the target value $SV_n$ by the I operation. Therefore, a control response time is considerably prolonged, resulting in a serious industrial drawback.

A cause for this drawback will be explained below. The change rate limiting means 4 limits a unit updating amount by the velocity-to-positional signal converting means 5, and omits a first change in P+D operations. Since the change rate limiting means 4 subtracts a decrease produced by the D operation within the limitation range of the change rate, a manipulative variable MV is temporarily decreased and is then increased and saturated by only the I operation, like in MV of a curve (d) in FIG. 4. At the same time, a control response PV temporarily makes a counter response, and is then slowly increased and saturated by only the I operation, like in PV of a curve (e) in FIG. 4, resulting in a very long control response time.

In the conventional controlling apparatus, when a change in manipulative variable exceeds a change rate limit value or an upper or lower limit value, and is restored within a limitation range, inappropriate signal processing is performed, and a serious drawback is posed in practical applications.

A PID controlling apparatus of this type is widely utilized for control in a variety of fields such as plant instrumentation, and forms the basis of such control. When advanced plant operations, e.g., a flexible, optimized, or ultra-automated planet operation is to be realized in future, a change rate limitation and upper and lower limitations of a manipulative variable are indispensable, and a demand has arisen for advanced use of these limitation functions.

SUMMARY OF THE INVENTION

It is an object of the present invention to provide a controlling apparatus which can execute signal processing succeeding the essence of PID control when a PI or PID controlling output exceeds a predetermined upper or lower limit value or a predetermined change rate limit value, can assure excellent controllability and a short response time, and can guarantee stability and safety.

In order to achieve the above object, a controlling apparatus of the present invention comprises:
  deviation means for calculating a deviation between a process variable from a controlled system and a target value, and outputting the deviation;
  first controlling means for receiving the deviation, executing a velocity-type I controlling calculation, and outputting a first calculation output, the first controlling means including
    output means for outputting the first calculation output, and
    stopping means for selectively stopping the output of the first calculation output;
  second controlling means for receiving the deviation, executing a velocity-type P or PD controlling calculation, and outputting a second calculation output;

summing means for receiving the first and second calculation outputs, summing the first and second calculation outputs, and outputting a velocity-type manipulative variable;

positional signal conversion means for converting the velocity-type manipulative variable into a positional manipulative variable, and outputting the positional manipulative variable;

limitation means for receiving the positional manipulative variable, limiting a magnitude of the positional manipulative variable to fall within a range between predetermined upper and lower limit values, limiting a change rate of the positional manipulative variable within a predetermined change rate limit value, and outputting a limited manipulative variable, the limited manipulative variable being supplied to the controlled system; and limit-deviation judgment means for receiving the positional manipulative variable and the limited manipulative variable, and judging whether or not the positional manipulative variable is deviated from at least one of upper and lower limit values and the change rate limit value, the limit-deviation judgment means supplying a signal for stopping the supply of the first calculation output to the summing means to the stopping means, and stopping the summing operation by the summing means, thereby setting the velocity-type manipulative variable in a hold state, when the limit-deviation judgment means determines that the manipulative variable is deviated.

In a preferred embodiment, the limit-deviation judgment means includes:

deviation judgment means for judging whether or not the manipulative variable exceeds at least one of the upper and lower limit values and the change rate limit value, and for, when the manipulative variable exceeds one of the limit values, outputting a deviation signal, sign discriminating means for receiving the deviation signal and the first calculation output, discriminating whether or not the deviation signal and the first calculation output have the same sign, and outputting one of same and different sign discrimination signals, and sum operation judgment means for receiving the deviation signal, and the same or different sign discrimination signal, supplying a first signal for causing the summing means to continue the sum operation to the stopping means in response to the deviation signal and the different sign discrimination signal, and supplying a second signal for causing the summing means to stop the sum operation to the stopping means to set the velocity-type manipulative variable in a hold state in response to the deviation signal and the same sign discrimination signal.

According to the present invention, in order to make zero a deviation between a target value and a process variable from a controlled system, a controlling calculation is executed by a PI or PID controlling means to obtain a velocity-type PI or PID controlling output, and this velocity-type controlling output is converted into a positional signal, thereby obtaining a positional manipulative variable. Thereafter, the positional manipulative variable is applied to the controlled system to control it. In this case, the magnitude and the change rate of the positional manipulative variable are respectively limited by the upper/lower limiting means and the change rate limiting means to fall within predetermined ranges, so that the limited manipulative variable is applied to the controlled system.

In this signal processing system, the limit-deviation judgment means judges whether or not a change in positional manipulative variable exceeds one of upper and lower limit values defined by the upper/lower limiting means and a change rate limit value defined by the change rate limiting means. When the manipulative variable exceeds one of these limit values, a sum operation is stopped, and a sum controlling component is set in a hold state.

Note that the limit-deviation judgment means judges whether or not the change in positional manipulative variable exceeds one of upper and lower limit values defined by the upper/lower limiting means and a change rate limit value defined by the change rate limiting means, and also judges whether or not the sign of the signal exceeding the limit is the same as that of a velocity-type I controlling output. When it is determined that the manipulative variable exceeds one of the upper and lower limit values of the upper/lower limiting means and the change rate limit value of the change rate limiting means, and that its sign is different from that of the velocity-type I controlling output, the sum operation is continued; when it is determined that the sign is the same as that of the velocity-type I controlling output, the sum operation is stopped, and a sum controlling component is set in a hold state.

According to the present invention, even if arbitrary upper and lower limit values or an arbitrary change rate limit value are or is given to a manipulative variable, a velocity-type P or D controlling output will never be omitted. Therefore, the conventional drawbacks can be eliminated, and stable and safe control with high controllability can be realized. As a result, the basis of a plant instrumentation system can be further reinforced.

In addition, a change state of a manipulative variable can be quickly judged, and a change in target value can be stabilized while appropriately selecting one of normal sum continuation and stopping modes.

In development of plant operation control in future, such as flexible, optimized, or ultra-automated plant operation control, it is important to effectively use upper and lower limit values and a change rate limit value. Since the apparatus of the present invention can effectively use these limitations and can eliminate conventional problems, it can contribute to the industrial field.

Additional objects and advantages of the invention will be set forth in the description which follows, and in part will be obvious from the description, or may be learned by practice of the invention. The objects and advantages of the invention may be realized and obtained by means of the instrumentalities and combinations particularly pointed out in the appended claims.

BRIEF DESCRIPTION OF THE DRAWINGS

The accompanying drawings, which are incorporated in and constitute a part of the specification, illustrate presently preferred embodiments of the invention and, together with the general description given above and the detailed description of the preferred embodiments given below, serve to explain the principles of the invention.

FIG. 2 is a graph for comparing behaviors of manipulative variable in a conventional controlling apparatus and a controlling apparatus of the present invention when a target value is changed;

FIG. 3 is a graph showing a state wherein a manipulative variable varies near a limit value;

FIG. 4 is a graph for comparing response times of a manipulative variable and a process variable in the conventional controlling apparatus and in the controlling apparatus of the present invention when a target value is changed stepwise;

FIG. 7 is a block diagram showing a controlling apparatus according to the third embodiment of the present invention;

FIG. 9 is a block diagram of a limit-deviation judgment means and a deviation judgment means in the controlling apparatus according to the fifth embodiment of the present invention.

DETAILED DESCRIPTION OF THE PREFERRED EMBODIMENTS

Prior to a description of the embodiment of the present invention, PID control will be examined below. The velocity-type PID algorithm is indispensable for a process instrumentation system. However, in order to cope with a complicated and advanced instrumentation system in future, it is important to eliminate drawbacks of the velocity-type PID algorithm.

So-called "essence of PID control" will be examined below, i.e., which processing is effective for PID controlling calculations will be examined below. The features of the PID terms are analyzed based on PID fundamental formula (1), and are summarized like in a Table below:

As can be apparent from this table, from the viewpoint of "succeeding of the essence of PID control", when a change in manipulative variable exceeds the upper or lower limit value or the change rate limit value, a velocity-type I controlling output can be omitted. However, a velocity-type P or D controlling output cannot be omitted for any reason. That is, when the velocity-type P or D controlling output is omitted, the "essence of PID control" is lost, thus posing a problem.

In this respect, in a conventional apparatus, when a change in manipulative variable exceeds a change rate limit value, the change rate limiting means 4 omits most of velocity-type P+D controlling outputs. Furthermore, the velocity-to-positional signal converting means 5 with upper and lower limits omits most of velocity-type P+D controlling outputs. Therefore, in the conventional apparatus, the "essence of PID control" can no longer be succeeded, and this causes various drawbacks.

The controlling apparatus of the present invention basically uses a velocity-type PID algorithm, and can realize an arrangement which can keep limitations on signal processing shown in the Table above, and can succeed the "essence of PID control" when a manipulative variable exceeds a predetermined upper or lower limit value or a change rate limit value.

Figure 1:
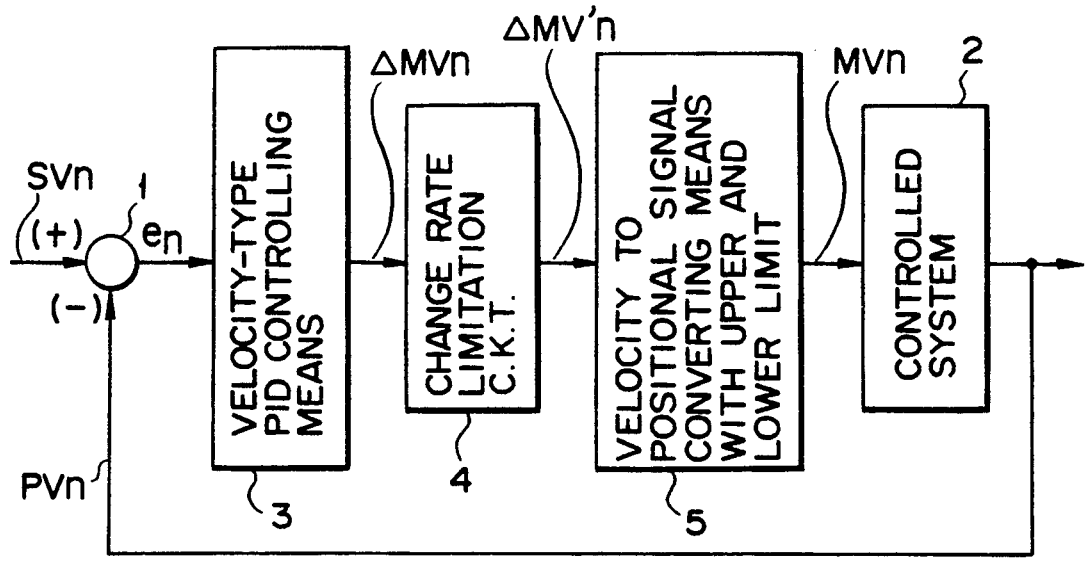
FIG. 1 is a block diagram of a conventional controlling Apparatus.
Figure 5:
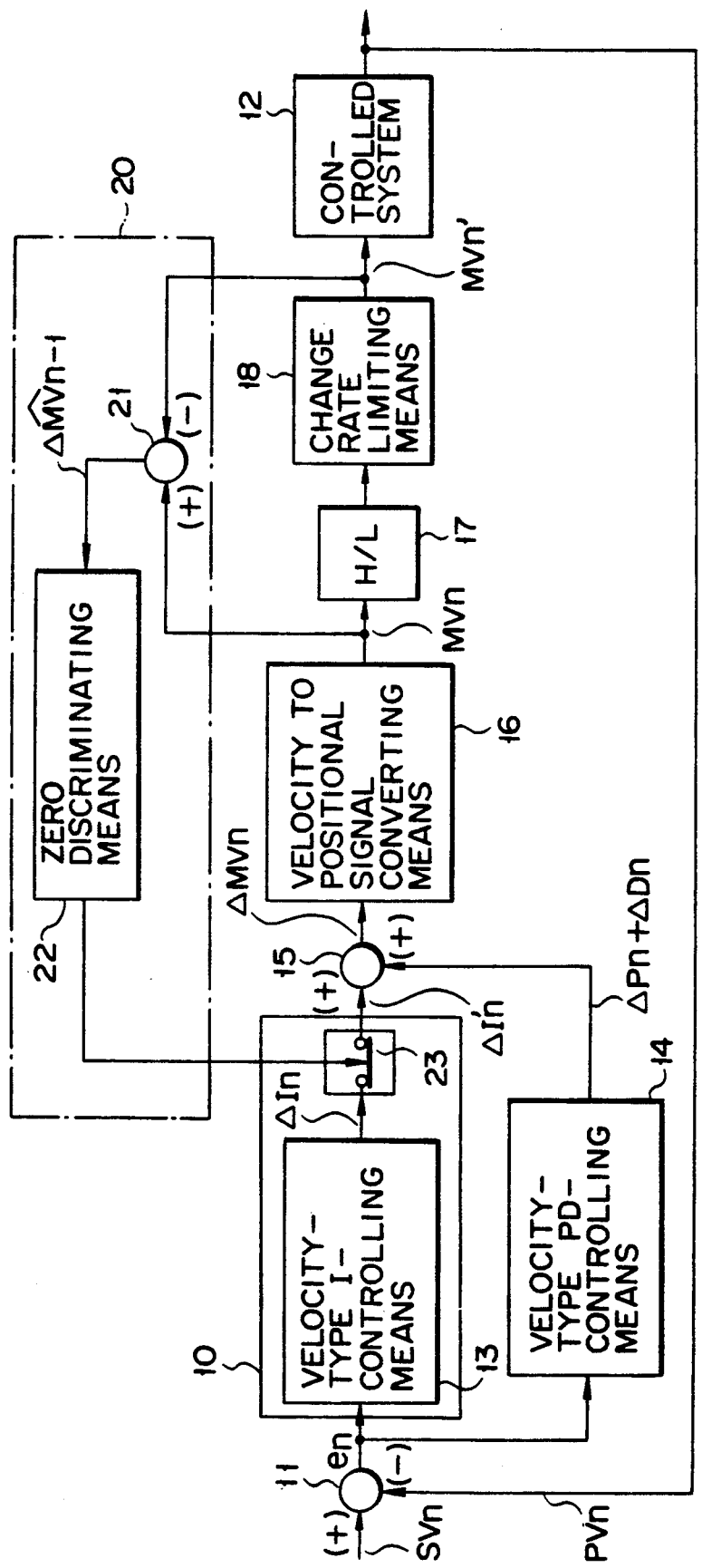
FIG. 5 is a block diagram showing a controlling apparatus according to the first embodiment of the present invention.

A controlling apparatus according to the first embodiment of the present invention will be described hereinafter with reference to FIG. 5. In general, a PI controlling apparatus including no D operation is known. However, this embodiment will exemplify a PID controlling apparatus. In FIG. 5, a deviation calculating means 11 subtracts a present process variable $PV_n$ of a controlled system 12 from a present target value $SV_n$, thereby obtaining a deviation en. A calculating means 10 comprises a velocity-type I-controlling means 13 for obtaining an I controlling output $\Delta I_n$ by a velocity-type I operation based on the deviation $e_n$, and a switch means 23 for selectively stopping an output of the velocity-type I-controlling means 13. Upon reception of the deviation $e_n$, a velocity-type PD-controlling means 14 obtains a P+D controlling output $\Delta P_n + \Delta D_n$ by velocity-type P and D operations. The outputs from these controlling means 13 and 14 are added (integrated) by an addition (integral) means 15, and the obtained velocity-type PID sum controlling signal $\Delta MV_n$ is input to a velocity-to-positional signal converting means 16. The signal converting means 16 converts the velocity-type PID sum controlling signal into a positional PID controlling signal (also called a manipulative variable) $MV_n$. The positional PID controlling signal $MV_n$ is converted to a limited manipulative variable $MV_n'$ via an upper/lower limiting means 17 for limiting the positional PID controlling signal using predetermined upper and lower limit values, and a change rate limiting means 18 for limiting the positional PID controlling signal by a predetermined change rate. The limited manipulative variable $MV_n'$ controls the controlled system 12.

| Item | I: Integral Action | P: Proportional Action | D: Derivative Action |
| --- | --- | --- | --- |
| Calculation Formula | $Kp \times \frac{1}{T_I} \int e\, dt$ | $Kp \times e$ | $Kp \times T_D \times \frac{de}{dt}$ |
| Role in Control | Settlement of Previous Deviation (proportional to Integral of Deviation) | Corresponding to Magnitude of Present Deviation (Proportional to Present Deviation) | Corresponding to Conventional Estimated Change in Deviation (Proportional to Derivative of Deviation) |
| Characteristic of Output Signal | Indefinite | Zero Reference (When deviation = 0, output = 0) | Zero Reference (When deviation is not changed, output = 0) |
| Signal Omission | Possible | Impossible (When signal is omitted, output cannot become zero when deviation = 0) | Impossible (When signal is omitted, output cannot become zero when deviation is not changed) |
| Limitations on Signal Processing | No Limitations (Signal can be omitted as needed) | Velocity signal cannot be omitted due to upper and lower limit values and change rate limit value. | Velocity signal cannot be omitted due to upper and lower limit values and change rate limit value. |

A limit-deviation judgment means 20 receives the positional PID controlling signal $MV_n$ and the limited manipulative variable $MV_n'$, and judges whether or not the positional PID controlling signal $MV_n$ is deviated from the upper or lower limit value of the upper/lower limiting means 17 or the change rate limit value of the change rate limiting means 18. The limit-deviation judgment means 20 comprises a subtraction means 21, and a zero discriminating means 22. The subtraction means 21 subtracts the limited manipulative variable $MV_n'$ from the positional PID controlling signal $MV_n$. The zero discriminating means 22 discriminates whether the output from the subtraction means 21 is a signal almost close to zero or a signal other than zero. More specifically, the zero discriminating means 22 discriminates whether or not the manipulative variable $MV_n$ exceeds the upper or lower limit value or the change rate limit value of the limiters 17 and 18. The output signal from the zero discriminating means 22 is input to the switch means 23 interposed between the output of the velocity-type I-controlling means 13 and the addition means 15. When the output signal from the zero discriminating means 22 is almost zero, the switch means 23 is enabled, and the addition means 15 executes a normal integral operation. When the output signal from the zero discriminating means 22 is other than zero, the switch means 23 is disabled, and the addition means 15 stops the integral operation.

The operation of the above-mentioned apparatus will be described below. The deviation calculating means 11 subtracts the present process variable $PV_n$ from the present target value $SV_n$, and obtains a deviation $e_n$ of the two values as follows:

$$e_n = SV_n - PV_n$$

This deviation $e_n$ is input to the velocity-type I- and PD-controlling means 13 and 14.

The velocity-type I-controlling means 13 calculates the following equation, and outputs a velocity-type I controlling output $\Delta I_n$:

$$\Delta I_n = Kp \cdot (T_I/\tau) \cdot e_n \tag{4}$$

The velocity-type I controlling output $\Delta I_n$ is input to the addition means 15 via the enabled switch means 23.

The velocity-type PD-controlling means 14 calculates velocity-type P and D controlling calculations, that is:

$$\Delta P_n = Kp(e_n - e_{n-1}) \tag{5}$$

$$\Delta D_n = Kp \cdot (T_I/\tau)(e_n - 2e_{n-1} + e_{n-2}) \tag{6}$$

and, synthesizes these $\Delta P_n$ and $\Delta D_n$ to obtain an output $\Delta P_n + \Delta D_n$. The output $\Delta P_n + \Delta D_n$ is input to the addition means 15. The addition means 15 adds $\Delta I_n$ and $\Delta P_n + \Delta D_n$ to obtain a velocity-type PID controlling calculation signal given by:

$$\Delta MV_n = \Delta P_n + \Delta D_n + \Delta I_n' \tag{7}$$

This controlling signal $\Delta MV_n$ is supplied to the velocity-to-positional signal converting means 16, and is converted to a positional PID controlling signal $MV_n$ upon execution of the following calculation:

$$MV_n + MV_{n-1} + \Delta MV_n \tag{8}$$

The positional PID controlling signal $MV_n$ is applied to the controlled system 12 via the upper/lower limiting means 17 for limiting the signal to the predetermined upper and lower limit, and the change rate limiting means 18 for limiting the signal to the predetermined change rate, thereby controlling the controlled system 12 to have the deviation $e_n = 0$, i.e., $SV_n = PV_n$. Therefore, in this apparatus, since the velocity-type P and D controlling signals are not omitted, even if the controlling signal $\Delta MV_n$ exceeds a limit value after it is converted to the positional signal, the "essence of PID control" can be succeeded.

The limit-deviation judgment means 20 fetches an immediately preceding input signal value $MV_{n-1}$ of the upper/lower limiting means 17, and an immediately preceding output signal value $MV_{n-1}'$ of the change rate limiting means 18. The subtraction means 21 performs the following calculation, and outputs a subtraction output $\Delta \hat{MV}_{n-1}$:

$$\Delta \hat{MV}_{n-1} = MV_{n-1} - MV_{n-1}' \tag{9}$$

The subtraction output $\Delta \hat{MV}_{n-1}$ is supplied to the next zero discriminating means 22. The zero discriminating means 22 discriminates whether or not the signal from the subtraction means 21 is zero.

(A) When $\Delta \hat{MV}_{n-1} = 0$,

The zero discriminating means 22 discriminates that the positional PID controlling signal, i.e., the manipulative variable $MV_n$ exceeds neither the upper and lower limit values nor the change rate limit value. The switch means 23 is enabled, and a so-called normal integral operation is executed. Therefore, a limited execution velocity-type I controlling signal $\Delta I_n'$ is given by:

$$\Delta I_n' = \Delta I_n = Kp \cdot (\tau/T_I) \cdot e_n$$

(B) When $\Delta \hat{MV}_{n-1} \neq 0$,

The zero discriminating means 22 discriminates that the manipulative variable $MV_n$ exceeds one of the upper and lower limit values, and the change rate limit value. The switch means 23 is disabled, and the integral operation is stopped. Therefore, a limited execution velocity type I controlling signal $\Delta I_n'$ is given by:

$$\Delta I_n' = 0$$

Thus, only the integral operation is executed.

A controlling apparatus according to the second embodiment of the present invention will be described below with reference to FIG. 6. The same reference numerals in FIG. 6 denote the same parts as in FIG. 5, and a detailed description thereof will be omitted. This embodiment is an improvement of the limit-deviation judgment means 20. The limit-deviation judgment means 20 of this embodiment has a function of causing the velocity-type I controlling output $\Delta I_n$ which exceeds one of the upper and lower limit values and the change rate limit value to quickly fall within a limitation range when a condition for causing the velocity-type I controlling output $\Delta I_n$ to fall within a limitation range is satisfied. The limit-deviation judgment means 20 of this embodiment also has the following function. That is, when the polarities of the limited value $\Delta MV_{n-1}$ and the velocity-type I controlling signal $\Delta I_n = Kp \cdot (\tau/T_I) \cdot e_n$ have the same sign, the normal integral operation is executed so as to prevent the velocity-type I controlling output $\Delta I_n$ from being kept exceeding one of limit values, e.g., the upper or lower limit value; otherwise, the integral operation is stopped.

This embodiment will be described in detail below. The limit-deviation judgment means 20 comprises a deviation judgment means 30, a sign discriminating means 24, and an integral operation judgment means 25. The deviation judgment means 30 comprises a subtraction means 21, and a zero discriminating means 22 to judge whether or not the positional PID controlling output $MV_n$ exceeds one of the upper and lower limit values and the change rate limit value. The sign discriminating means 24 discriminates whether or not the velocity-type I controlling output $\Delta I_n$ of the velocity-type I-controlling means 13 and the output $\Delta M\hat{V}_{n-1}$ of the subtraction means 21 have the same sign. When it is determined that the output from the zero discriminating means 22 exceeds one of limit values, and the sign discriminating means 24 discriminates that $\Delta I_n$ and $\Delta M\hat{V}_{n-1}$ have different signs, the integral operation judgment means 25 determines that the velocity-type I controlling output $\Delta I_n$ is in a direction to cancel limitations, and enables the switch means 23. When $\Delta I_n$ and $\Delta M\hat{V}_{n-1}$ have the same sign, the integral operation judgment means 25 disables the switch means 23. Of course, when the positional PID controlling output $MV_n$ does not exceed any of the upper and lower limit values and the change rate limit value, the integral operation judgment means 25 enables the switch means 23.

The operation of the apparatus shown in FIG. 6 will be described below.

(a) When the positional PID controlling output, i.e., the manipulative variable $MV_n$ does not exceed any of the upper and lower limit values and the change rate limit value, it can directly pass through the upper/lower limiting means 17 and the change rate limiting means 18. Therefore, the output from the subtraction means 21 is given by:

$$\Delta M\hat{V}_{n-1}=0$$

In this case, the integral operation judgment means 25 determines a normal integral operation, and outputs an enable control signal to enable the switch means 23. As a result, $$\Delta I_n'=\Delta I_n=K_p\cdot(\tau/T_I)\times e_n$$

Thus a normal integral operation is executed (b) When the manipulative variable $MV_n$ exceeds one of the upper and lower limit values and the change rate limit value, the output from the subtraction means 21 is given by:

$$\Delta M\hat{V}_{n-1}\neq 0$$

Thus, the zero discriminating means 22 outputs a signal indicating not zero, i.e., a signal indicating that the manipulative variable $MV_n$ exceeds one of the upper and lower limit values and the change rate limit value, to the integral operation judgment means 25. The sign discriminating means 24 compares the signs of the positional PID controlling output $\Delta I_n$ and the subtraction output $\Delta M\hat{V}_{n-1}$. When these outputs have different signs, the means 24 outputs a signal indicating this to the integral operation judgment means 25. As a result, the integral operation judgment means 25 determines a normal integral operation since the positional PID controlling output $MV_n$ is in a direction to cancel limitations although it exceeds one of the upper and lower limit values and the change rate limit value, and similarly outputs an enable control signal to enable the switch means 23. Therefore, in this case, a normal integral operation given by the following equation is executed:

$$\Delta I_n'=\Delta I_n=K_p\cdot(\tau/T_I)\times e_n$$

(c) When the manipulative variable $MV_n$ exceeds one of the upper and lower limit values and the change rate limit value, and the sign discriminating means 24 determines that the two outputs have the same sign, the integral operation judgment means 25 determines to stop an integral operation, and disables the switch means 23. As a result, $$\Delta I_n'=0$$

Thus, an integral operation is stopped.

According to the arrangement of the present invention, when the manipulative variable deviates from one of the predetermined upper and lower limit values and the change rate limit value, only the velocity-type I controlling output is omitted as needed, and the velocity-type P or D controlling output is not omitted. Therefore, the "essence of PID control" can be reliably succeeded, and a return phenomenon of a manipulative variable like in a conventional apparatus can be prevented. As a result, high controllability can be assured, and safety and stability can be greatly improved.

As a result, when the deviation $e_n$ is changed stepwise, the manipulative variable behaves like a curve (c) in FIG. 2, and desired MV can be obtained.

When the target value $SV_n$ is changed stepwise, a response shown in FIG. 4 is obtained. More specifically, since the velocity-type P and D controlling outputs are not omitted, MV and PV change like curves (f) and (g) in FIG. 4, and a response time can be greatly shortened as compared to a conventional apparatus.

Figure 6:
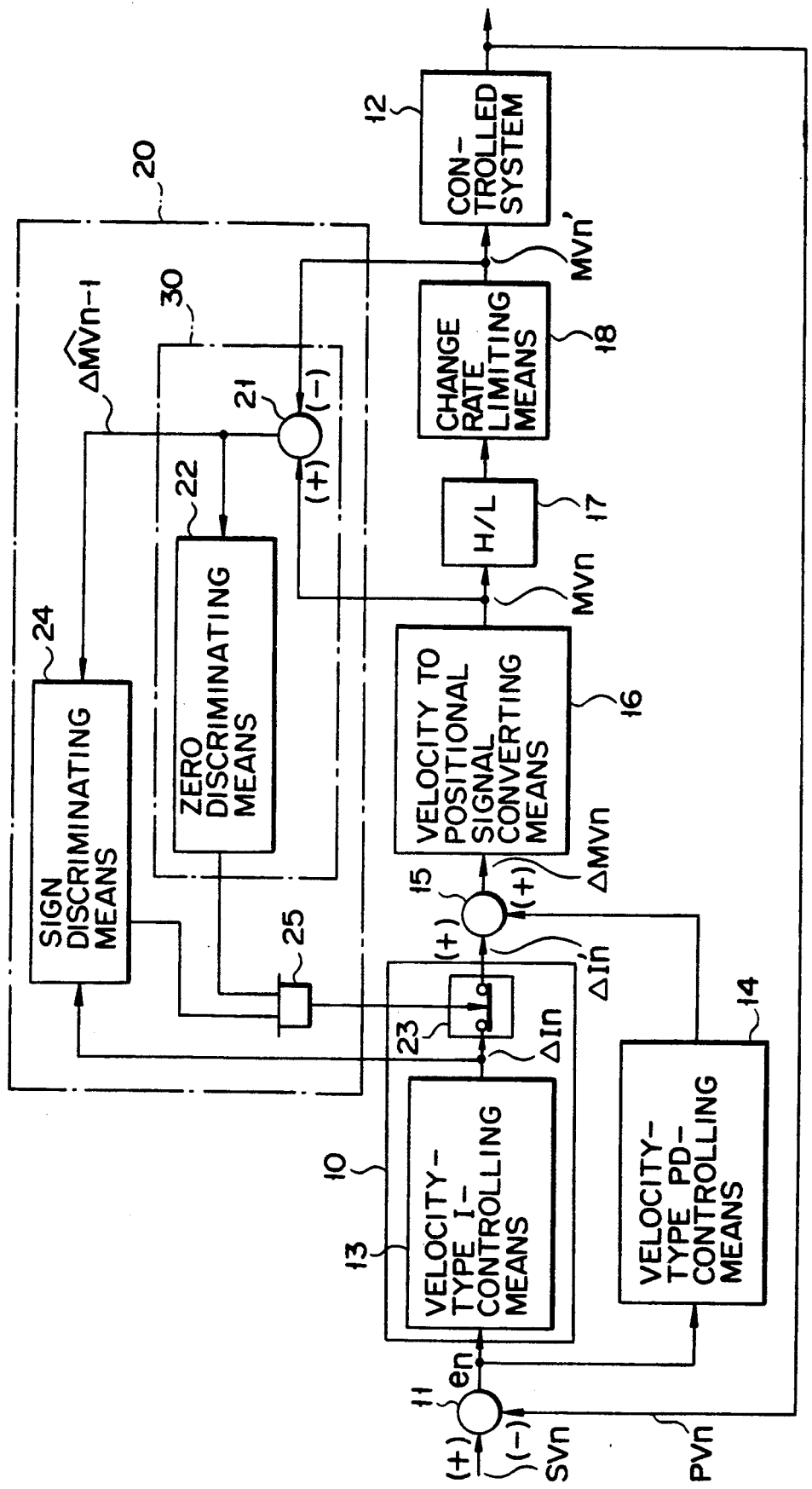
FIG. 6 is a block diagram showing a controlling apparatus according to the second embodiment of the present invention.

In the second embodiment shown in FIG. 6, when the manipulative variable is deviated from the upper or lower limit value or the change rate limit value, if the manipulative variable is in a cancel direction, the integral operation is executed. Therefore, the manipulative variable can be quickly set to be a target value.

A controlling apparatus according to the third embodiment of the present invention will be described below with reference to FIG. 7. In the first embodiment, the PID controlling calculation has been exemplified. The present invention can be similarly applied to a PI controlling calculation. In this case, the velocity-type PD-controlling means 14 shown in FIG. 5 can be replaced with a velocity-type P-controlling means 32.

Figure 8:
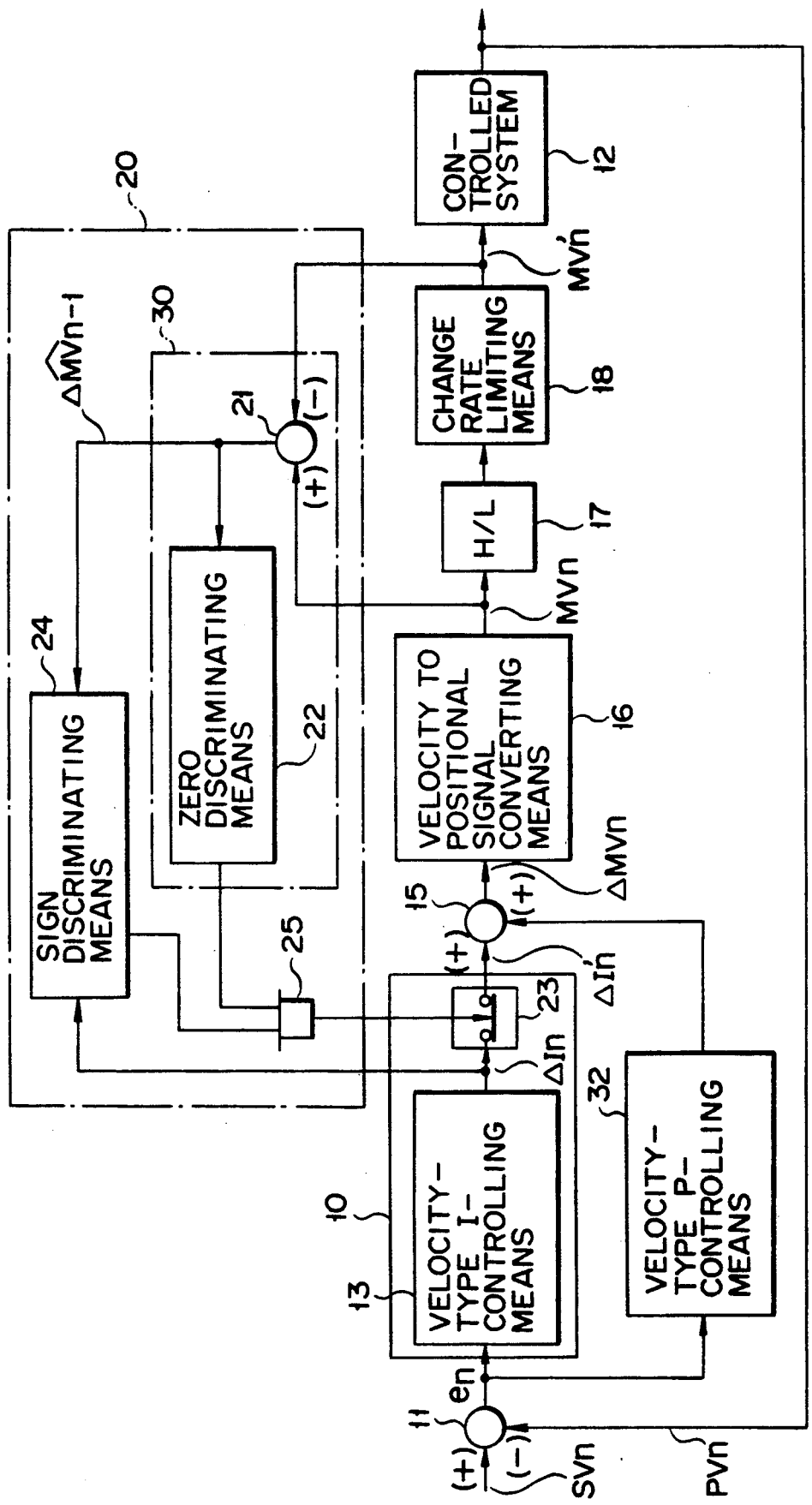
FIG. 8 is a block diagram showing a controlling apparatus according to the fourth embodiment of the present invention.

A controlling apparatus according to the fourth embodiment of the present invention will be described below with reference to FIG. 8. In the second embodiment, the PID controlling calculation has been exemplified. The present invention can be similarly applied to a PI controlling calculation. In this case, the velocity-type PD-controlling means 14 shown in FIG. 6 can be replaced with a velocity-type P-controlling means 32.

The fifth embodiment of the present invention will be described below with reference to FIG. 9. In this embodiment, whether or not a manipulative variable exceeds an upper or lower limit value or a change rate limit value is detected by an OR gate 34. An input signal to an upper/lower limiting means 17 and an upper limit value H, e.g., 90%, are compared by a comparator 36, and a comparison output is input to the OR gate 34. The input signal to the upper/lower limiting means 17 and a lower limit value L, e.g., 10%, are compared by a comparator 38, and the comparison output is input to the OR gate 34. The input and output of a change rate limiting means 18 are input to a subtracter 40 to obtain a difference signal. The difference signal is input to an absolute value circuit 42 to obtain an absolute value signal of the difference signal. The absolute value signal is input to the first terminal of a comparator 44, and a limit value of the change rate limiting means 18, e.g., 5% is input to the second terminal of the comparator 44. The output from the comparator 44 is input to the OR gate 34. The OR gate 34 can provide an output equivalent to the output from the limit-deviation judgment means 20 in the first embodiment shown in FIG. 5, or the output from the deviation judgment means 30 in the second embodiment shown in FIG. 6. In response to the output from the OR gate 34, a switch means 23 may be controlled.

In each of the above embodiments, $\Delta I_n = K_p \cdot (\tau /T_I) \cdot e_n$ as an integral term is stopped by disabling the switch means 23. However, the switch means 23 may be modified as follows. That is, the integral time $T_I$ may be set to be a very large value to equivalently obtain $\Delta I_n = 0$, thereby stopping the integral operation. The switch means 23 may also be modified such that Kp, $\tau$, and $e_n$ used in calculation of the integral term are forcibly set to be zero.

A complete derivative operation has been exemplified as a derivative operation, but an incomplete derivative operation may be used.

In each of the above embodiments, a positional manipulative variable is input to the change rate limiting means 18 via the upper/lower limiting means 17. However, the positional manipulative variable may be input to the upper/lower limiting means 17 via the change rate limiting means 18.

Additional advantages and modifications will readily occur to those skilled in the art. Therefore, the invention in its broader aspects is not limited to the specific details, and representative devices shown and described. Accordingly, various modifications may be made without departing from the spirit or scope of the general inventive concept as defined by the appended claims and their equivalents.

What is claimed is:

1. A controlling apparatus utilized in a process instrumentation system, comprising:
   deviation means for calculating a deviation between a process variable from a controlled system and a target value, and outputting the deviation;
   first controlling means for receiving the deviation, executing a velocity-type I controlling calculation, and outputting a first calculation output, said first controlling means including
   output means for outputting the first calculation output, and
   stopping means for selectively stopping the output of the first calculation output;
   second controlling means for receiving the deviation, executing a velocity-type P or PD controlling calculation, and outputting a second calculation output;
   summing means for receiving the first and second calculation outputs, summing the first and second calculation outputs, and outputting a velocity-type manipulative variable;
   positional signal conversion means for converting the velocity-type manipulative variable into a positional manipulative variable, and outputting the positional manipulative variable;
   limitation means for receiving the positional manipulative variable, limiting a magnitude of the positional manipulative variable to fall within a range between predetermined upper and lower limit values, limiting a change rate of the positional manipulative variable within a predetermined change rate limit value, and outputting a limited manipulative variable, the limited manipulative variable being supplied to said controlled system; and
   limit-deviation judgment means for receiving the positional manipulative variable and the limited manipulative variable, and judging whether or not the positional manipulative variable is deviated from at least one of upper and lower limit values and the change rate limit value, said limit-deviation judgment means supplying a signal for stopping supply of the first calculation output to said summing means to said stopping means, and stopping the sum operation by said summing means, thereby setting the velocity-type manipulative variable in a hold state, when said limit-deviation judgment means determines that the manipulative variable is deviated.

2. An apparatus according to claim 1, wherein said limit-deviation judgment means includes:
   subtraction means for receiving the positional manipulative variable, and the limited manipulative variable, and outputting a difference signal between the positional manipulative variable and the limited manipulative variable; and
   zero discriminating means for discriminating whether or not the difference signal is zero, said zero discriminating means generating the deviation signal when the difference signal is not zero.

3. An apparatus according to claim 1, wherein said limit-deviation judgment means includes:
   first comparison means for receiving the positional manipulative variable and the upper limit value, comparing the positional manipulative variable and the upper limit value, and outputting a first comparison signal;
   second comparison means for receiving the positional manipulative variable and the lower limit value, comparing the positional manipulative variable and the lower limit value, and outputting a second comparison signal;
   subtraction means for receiving the positional manipulative variable and the limited manipulative variable, and outputting a difference signal between the positional manipulative variable and the limited manipulative variable;
   absolute value means for receiving the difference signal, and converting the difference signal into an absolute value;
   third comparison means for receiving the absolute value and the change rate limit value, comparing the absolute value and the change rate limit value, and outputting a third comparison signal;
   OR means for receiving the first, second, and third comparison signals, and outputting a logical sum of the first, second, and third comparison signals; and
   when the logical sum indicates that the positional manipulative variable is deviated from at least one of the upper and lower limit values and the change rate limit value, said limit-deviation judgment means supplies a signal for stopping supply of the first calculation output to said summing means to said stopping means to stop the sum operation of said summing means, thereby setting the velocity-type manipulative variable in a hold state.

4. An apparatus according to claim 1, wherein said limit-deviation judgment means includes:
   deviation judgment means for judging whether or not the manipulative variable exceeds at least one of the upper and lower limit values and the change rate limit value, and for, when the manipulative variable exceeds one of the limit values, outputting a deviation signal;

sign discriminating means for receiving the deviation signal and the first calculation output, discriminating whether or not the deviation signal and the first calculation output have the same sign, and outputting one of same and different sign discrimination signals; and integral operation judgment means for receiving the deviation signal, and the same or different sign discrimination signal, supplying a first signal for causing said summing means to continue the sum operation to said stopping means in response to the deviation signal and the different sign discrimination signal, and supplying a second signal for causing said summing means to stop the sum operation to said stopping means to set the velocity-type manipulative variable in a hold state in response to the deviation signal and the same sign discrimination signal.

5. An apparatus according to claim 4, wherein said deviation judgment means includes:

subtraction means for receiving the positional manipulative variable and the limited manipulative variable, and outputting a difference signal between the positional manipulative variable and the limited manipulative variable; and zero discriminating means for discriminating whether or not the difference signal is zero, said zero discriminating means generating the deviation signal when the difference signal is not zero.

6. An apparatus according to claim 4, wherein said deviation judgment means includes:

first comparison means for receiving the positional manipulative variable and the upper limit value, comparing the positional manipulative variable and the upper limit value, and outputting a first comparison signal;

second comparison means for receiving the positional manipulative variable and the lower limit value, comparing the positional manipulative variable and the lower limit value, and outputting a second comparison signal;

subtraction means for receiving the positional manipulative variable and the limited manipulative variable, and outputting a difference signal between the positional manipulative variable and the limited manipulative variable;

absolute value means for receiving the difference signal, and converting the difference signal into an absolute value;

third comparison means for receiving the absolute value and the change rate limit value, comparing the absolute value and the change rate limit value, and outputting a third comparison signal;

OR means for receiving the first, second, and third comparison signals, and outputting a logical sum of the first, second, and third comparison signals; and when the logical sum indicates that the positional manipulative variable is deviated from at least one of the upper and lower limit values and the change rate limit value, said deviation judgment means generates the deviation signal.

7. An apparatus according to claim 1, wherein said limitation means includes:

upper/lower limiting means for limiting the magnitude of the positional manipulative variable within a range of the predetermined upper and lower limit values; and change rate limiting means for limiting a change rate of the positional manipulative variable within the predetermined change rate limit value.

* * * * *